G. J. & H. C. GARRETT.
VEHICLE WHEEL.
APPLICATION FILED MAR. 11, 1912.

1,055,029.

Patented Mar. 4, 1913.

2 SHEETS—SHEET 1.

WITNESSES
R. E. Fryar
H. E. Randle

G. J. Garrett and
H. C. Garrett
INVENTORS
By Robert W. Randle
ATTORNEY.

G. J. & H. C. GARRETT.
VEHICLE WHEEL.
APPLICATION FILED MAR. 11, 1912.

1,055,029.

Patented Mar. 4, 1913.

2 SHEETS—SHEET 2.

G. J. Garrett and
H. C. Garrett
INVENTORS;

By Robert W. Randle,
ATTORNEY.

WITNESSES
R. E. Fryar.
R. E. Randle.

UNITED STATES PATENT OFFICE.

GLOSTER J. GARRETT AND HERBERT C. GARRETT, OF RICHMOND, INDIANA.

VEHICLE-WHEEL.

1,055,029.        Specification of Letters Patent.        Patented Mar. 4, 1913.

Application filed March 11, 1912. Serial No. 682,903.

*To all whom it may concern:*

Be it known that we, GLOSTER J. GARRETT and HERBERT C. GARRETT, both citizens of the United States, residing in the city of Richmond, in the county of Wayne and State of Indiana, have invented a new and useful Vehicle-Wheel, of which the following is a full, clear, and comprehensive specification and exposition, being such as will enable others to make and use the same with absolute exactitude.

Our present invention relates to resilient wheels intended particularly for use on automobiles or other vehicles where a maximum of resiliency is required, at the same time dispensing with the use of the ordinary pneumatic tires.

The object of our invention, broadly speaking, is to provide a vehicle-wheel which will be strong and durable in construction, neat and attractive in appearance, comparatively light in weight, and which can be manufactured and sold at a comparatively low price, at the same time increasing the efficiency of wheels of this character.

Other objects and particular advantages of our invention will be brought out and made apparent, especially to the mechanic, in the course of the following description, and that which is new and useful will be correlated in the appended claims.

The preferred manner for the accomplishment of our invention is shown in the accompanying two sheets of drawings, in which—

Figure 1:
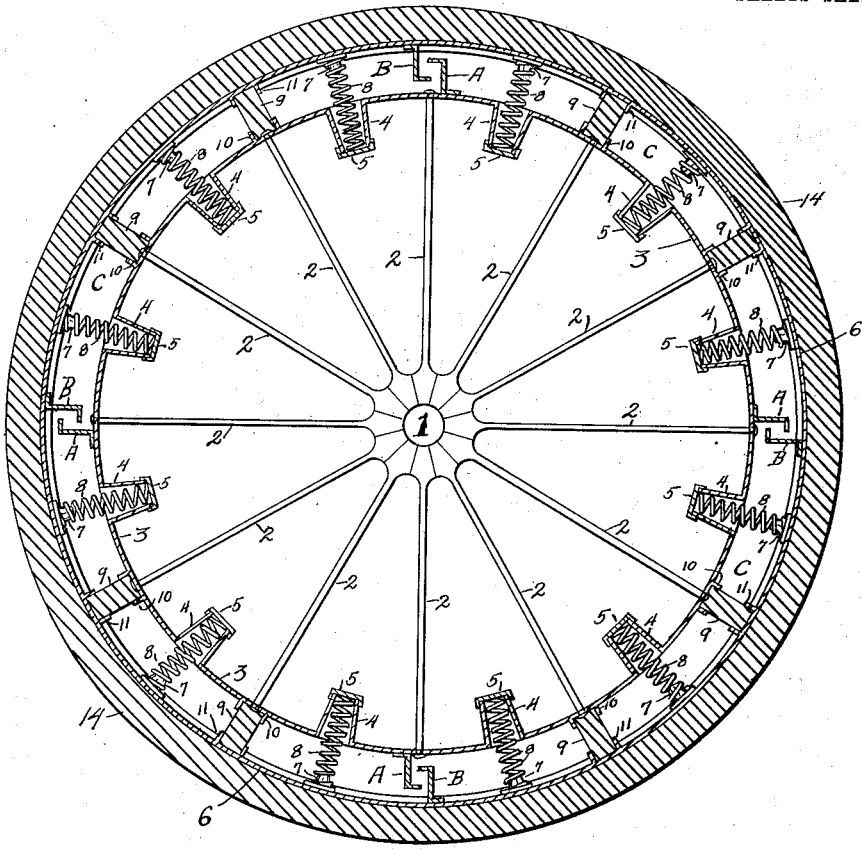
Figure 2:
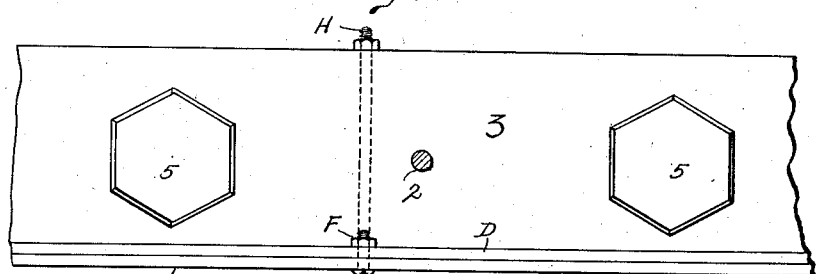
Figure 3:
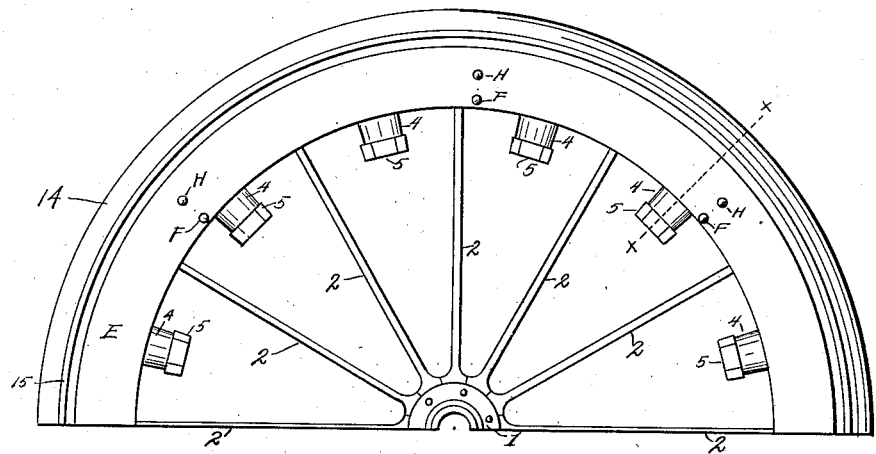
Figure 4:
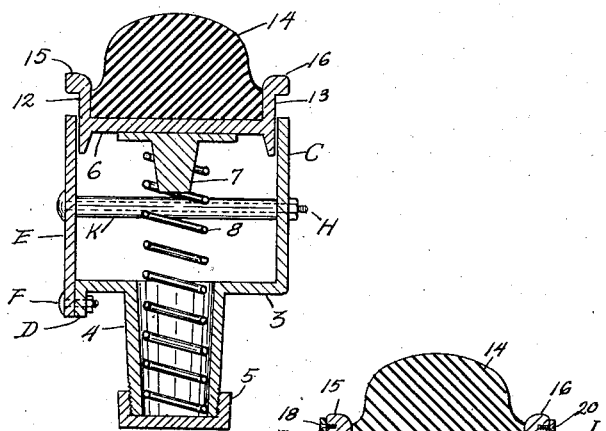
Figure 5:
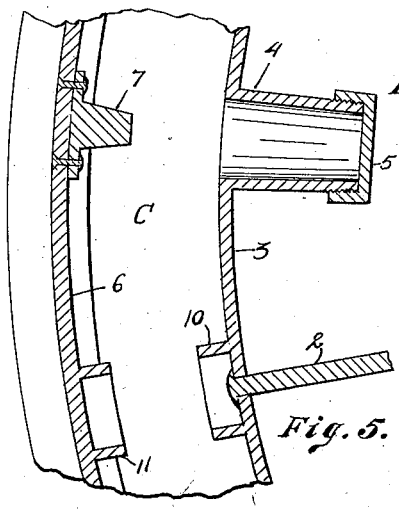
Figure 6:
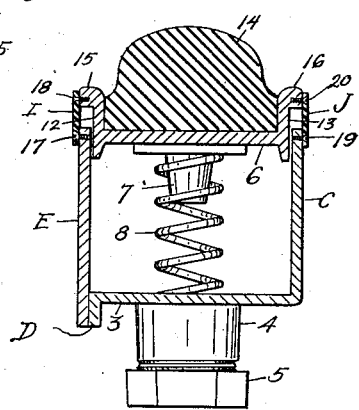

Figure 1 is a side elevation showing the interior of our wheel the side plates being removed. Fig. 2 is a detail plan view of the inner periphery of the inner rim of our wheel. Fig. 3 is a side elevation of one-half of our wheel, showing same complete and in operative condition. Fig. 4 is a cross section, as taken on line x—x of Fig. 3. Fig. 5 is a circumferential central section of a fragment showing all of the parts with the omission of the springs. And Fig. 6 is a cross section, being substantially the same as that shown in Fig. 4 with the addition of means protecting the joints at the sides to exclude dust and water.

Similar indices denote like parts throughout the several views of the two sheets of drawings.

In order that the construction and the operation of our invention may be more fully understood we will now take up a detailed description thereof in which we will set forth the invention and the several features thereof as fully and as comprehensively as we may.

In the drawings numeral 1 denotes the hub, from which radiate a plurality of spokes 2, these parts being of any desired construction or any well known form.

Our invention includes the inner rim 3, in which the outer ends of the spokes 2 are secured in any desired manner.

Formed around in the rim 3 are a plurality of tapering sockets 4, which are located, preferably, one between each two of the spokes as shown, said sockets being formed to protrude centerward toward the hub, and their ends are each adapted to be closed by a cap 5, substantially as indicated. However the length of said sockets may be changed as desired for the purpose hereinafter made apparent.

Numeral 6 denotes the outer rim, which is located concentric with the rim 3 but it is spaced some distance therefrom.

Located around and secured to the inner periphery of the rim 6 are the tapering lugs 7, one being located opposite each socket 4, toward which they are directed and with which they may register. Said lugs are round in cross section, each having a flange extending out around its base whereby they may be riveted to the rim 6 as shown. Seated in each of said sockets 4 is a helical spring 8, one end resting against the cap 5 and the other end surrounding the lug 7 and seated against the flange thereof as indicated. Located between each two of said springs 8 is a cushion 9, each of which extends between the two rims 3 and 6. Sockets 10 are formed around on the outer periphery of the rim 3 in which the inner ends of said cushions 9 are seated; and in like manner sockets 11 are formed on the inner periphery of the rim 6, in which the outer ends of said cushions 9 are seated.

Extending out around each edge of the rim 6 are the flanges 12 and 13, thereby providing a channel for the solid rubber tire 14. The upper edges of said flanges 12 and 13 curve outwardly and apart, thereby forming the respective guards 15 and 16.

In order to retain the rims 3 and 6 in proper relations to each other, in other words to prevent creeping of the outer rim, we provide a plurality of guides, each composed of two oppositely disposed Z-shaped clips which are located as shown. One member A of each guide is secured to the periphery of the rim 3 and the other B is secured to the inner face of the rim 6. The position of the two members A and B of each guide with relation to each other is such that when the rims 3 and 6 are moved apart to a certain distance the free ends of the members A and B will engage each other, thereby preventing the rims 3 and 6 from spreading farther apart than desired. The members A and B of each guide are spaced a short distance apart, in order to allow the two which are horizontal at any time to move vertically with relation to each other in order that the hub, the spokes, and the inner rim may move up and down with relation to the outer rim and the tire which remain relatively stationary as to up and down movement. Extending outwardly from the back edge of the rim 3 and at right angles thereto is the fixed-plate C, which extends out with its outer portion in slidable contact with the face of the flange 13.

Extending inwardly at right angles to and integral with the other (front) edge of the rim 3 is the small flange D which is parallel to plate C, but oppositely directed with relation thereto.

Letter E designates the removable plate which is detachably connected to the front edge of the rim 3 and to the small flange D by the bolts F. The plate E extends outwardly even with plate C and its outer portion contacts with the face of the flange 12 against which it is adapted to slide.

Connecting plates C and E is a plurality of long bolts H by which the plates C and E may be made more or less tight upon the respective flanges 12 and 13.

In order to exclude dust and water from the space between the rims 3 and 6 we provide the means shown only in Fig. 6 which comprises two rings of sheet rubber, I and J: The former covering the space between the periphery of the plate E and the guard 15 to which it is secured by the screws 17 and 18, respectively; the latter covering the space between the plate C and the guard 16, to which it is secured by the screws 19 and 20, respectively.

From the above it is clear that the springs 8 and the cushions 9 will provide a compressible connection between the rims 3 and 6, thereby affording the proper degree of resiliency to the weight carried by the hub, in other words allowing the hub to remain practically stationary as regards vertical movements while the tire 14 moves up and down incident to travel over an uneven roadway.

We desire that it be understood that the sockets 4 may be made longer as desired; the springs 8 may be made longer and of any desired gage or stiffness; and the cushions 9 may be made of any desired size or material, although rubber is preferred as at present advised.

We desire that it be understood that various changes may be made in the several details of construction without departing from the spirit of our invention or sacrificing any of the advantages thereof.

Having now fully shown and described our invention and the best means for its construction to us known at this time, what we claim and desire to secure by Letters Patent of the United States, is—

1. A vehicle wheel comprising in combination an outer rim carrying a tire, an inner rim which is movable with relation to the outer rim but normally concentric therewith, a central hub, spokes rigidly connecting the hub and the inner rim, a plurality of tapering sockets located one between each two of the spokes and projecting centerward from the inner rim, a removable cap for each of said sockets adapted to close the inner end thereof, tapering lugs carried by the outer rim, there being one of said lugs located opposite and directed toward each of said sockets, a helical spring seated around each of said lugs, extending into one of said sockets, with its inner end seated against the cap thereof, a rubber cushion located between each two of said springs and connecting the inner and the outer rims, sockets for each end of said cushion, means for preventing creeping of the rims with relation to each other comprising a pair of Z-shaped clips adapted to lock together one member thereof being carried by the inner rim and the other member by the outer rim and adapted to overlap each other, and means for inclosing the space between the rims, all substantially as shown and described.

2. In a vehicle wheel having an inner and an outer rim spaced apart, a plurality of sockets formed in the inner rim and extending toward a common center, a cap for each socket, a lug located opposite each socket and carried by the outer rim, a coil spring surrounding each lug and extending into said socket, a rubber cushion located between each two of said springs and extending between the inner and the outer rims, sockets for the ends of said cushions, a plurality of means for preventing one rim from revolving with relation to the other rim, said means comprising a pair of Z-shaped clips adapted to engage each other one member being carried by the inner rim and the other member being carried by the outer rim, a fixed plate extending from one edge of the inner rim and overlapping the face of the outer rim, a removable plate secured to the inner rim and extending out over the outer rim, and means for closing the joints between the outer edges of said plates and the faces of the outer rims, all substantially as shown and described and for the purposes set forth.

In testimony whereof we have hereunto subscribed our names to this specification in the presence of two subscribing witnesses.

GLOSTER J. GARRETT.
HERBERT C. GARRETT.

Witnesses:
ROBT. W. RANDLE,
R. E. RANDLE.